US008321270B2

(12) United States Patent
Antonucci

(10) Patent No.: US 8,321,270 B2
(45) Date of Patent: *Nov. 27, 2012

(54) SYSTEM AND METHOD FOR A MULTIPLE MERCHANT STORED VALUE CARD

(75) Inventor: Donna A. Antonucci, Hoboken, NJ (US)

(73) Assignee: American Express Travel Related Services Company, Inc., New York, NY (US)

( * ) Notice: Subject to any disclaimer, the term of this patent is extended or adjusted under 35 U.S.C. 154(b) by 591 days.

This patent is subject to a terminal disclaimer.

(21) Appl. No.: 12/563,278

(22) Filed: Sep. 21, 2009

(65) Prior Publication Data

US 2010/0010889 A1  Jan. 14, 2010

Related U.S. Application Data

(62) Division of application No. 10/180,843, filed on Jun. 25, 2002, now Pat. No. 7,606,730.

(51) Int. Cl.
*G06Q 30/00* (2012.01)

(52) U.S. Cl. ............... 705/14.3; 705/14.27; 705/14.39; 705/16; 705/26.1; 705/400

(58) Field of Classification Search .............. 705/14.3, 705/14.27, 14.39, 16, 26.1, 400
See application file for complete search history.

(56) References Cited

U.S. PATENT DOCUMENTS

| | | | |
|---|---|---|---|
| 4,700,055 A | 10/1987 | Kashkashian, Jr. |
| 4,701,601 A | 10/1987 | Francini et al. |
| 4,736,094 A | 4/1988 | Yoshida |
| 5,025,372 A | 6/1991 | Burton et al. |
| 5,276,311 A | 1/1994 | Hennige |
| 5,578,808 A | 11/1996 | Taylor |
| 5,590,038 A | 12/1996 | Pitroda |
| 5,649,118 A | 7/1997 | Carlisle et al. |
| 5,689,100 A | 11/1997 | Carrithers et al. |
| 5,770,843 A | 6/1998 | Rose et al. |
| 5,806,045 A | 9/1998 | Biorge et al. |
| 5,859,419 A | 1/1999 | Wynn |
| 5,917,168 A | 6/1999 | Nakamura et al. |
| 5,923,016 A | 7/1999 | Fredregill et al. |
| 5,924,080 A | 7/1999 | Johnson |
| 5,955,961 A | 9/1999 | Wallerstein |
| 5,969,318 A | 10/1999 | Mackenthun |
| 6,012,636 A | 1/2000 | Smith |
| 6,024,286 A | 2/2000 | Bradley et al. |
| 6,032,136 A | 2/2000 | Brake, Jr. et al. |
| 6,119,933 A | 9/2000 | Wong et al. |
| 6,138,911 A | 10/2000 | Fredregill et al. |
| 6,163,771 A | 12/2000 | Walker et al. |
| 6,185,545 B1 | 2/2001 | Resnick et al. |
| 6,189,787 B1 | 2/2001 | Dorf |
| 6,205,553 B1 | 3/2001 | Stoffel et al. |
| 6,222,914 B1 | 4/2001 | McMullin |
| 6,243,688 B1 | 6/2001 | Kalina |
| 6,266,647 B1 | 7/2001 | Fernandez |

(Continued)

*Primary Examiner* — Raquel Alvarez
(74) *Attorney, Agent, or Firm* — Snell & Wilmer L.L.P.

(57) ABSTRACT

The loyalty system allows a consumer to accumulate general loyalty points from one or more merchants, and convert any desired subset of general points to loyalty dollars associated with a specific merchant. The system stores, for each consumer, the merchant loyalty dollars (or monetary equivalent) by merchant within a remotely-accessible host database or within a smart card database. Upon conducting a purchase at a particular merchant, the consumer may utilize a code key to facilitate access to the consumer's own loyalty dollars for the particular merchant. The loyalty dollars are then applied to the purchase transaction as a discount or rebate. The consumer may also re-load the merchant loyalty dollar accounts.

8 Claims, 3 Drawing Sheets

U.S. PATENT DOCUMENTS

| | | |
|---|---|---|
| 6,266,653 B1 | 7/2001 | Shiobara et al. |
| 6,293,462 B1 | 9/2001 | Gangi |
| 6,327,573 B1 | 12/2001 | Walker et al. |
| 6,330,543 B1 | 12/2001 | Kepees |
| 6,332,128 B1 | 12/2001 | Nicholson |
| 6,353,811 B1 | 3/2002 | Weissman |
| 6,354,492 B1 | 3/2002 | Powell et al. |
| 6,375,073 B1 | 4/2002 | Aebi et al. |
| 6,484,147 B1 | 11/2002 | Brizendine et al. |
| 6,594,640 B1 | 7/2003 | Postrel |
| 6,820,061 B2 | 11/2004 | Postrel |
| 6,829,586 B2 | 12/2004 | Postrel |
| 6,842,739 B2 | 1/2005 | Postrel |
| 6,947,898 B2 | 9/2005 | Postrel |
| 7,096,190 B2 | 8/2006 | Postrel |
| 2003/0216960 A1 | 11/2003 | Postrel |
| 2004/0039644 A1 | 2/2004 | Postrel |
| 2004/0097287 A1 | 5/2004 | Postrel |
| 2004/0098317 A1 | 5/2004 | Postrel |
| 2004/0107140 A1 | 6/2004 | Postrel |
| 2004/0220854 A1 | 11/2004 | Postrel |
| 2005/0021399 A1 | 1/2005 | Postrel |
| 2005/0021400 A1 | 1/2005 | Postrel |
| 2005/0021401 A1 | 1/2005 | Postrel |
| 2005/0060225 A1 | 3/2005 | Postrel |
| 2005/0080727 A1 | 4/2005 | Postrel |
| 2005/0149394 A1 | 7/2005 | Postrel |
| 2005/0240472 A1 | 10/2005 | Postrel |
| 2006/0020511 A1 | 1/2006 | Postrel |

US 8,321,270 B2

SYSTEM AND METHOD FOR A MULTIPLE MERCHANT STORED VALUE CARD

CROSS-REFERENCE TO RELATED APPLICATIONS

This application is a division of, and claims priority to, U.S. Pat. No. 7,606,730 issued Oct. 20, 2009 and entitled "SYSTEM AND METHOD FOR A MULTIPLE MERCHANT STORED VALUE CARD" (aka U.S. Ser. No. 10/180,843, filed on Jun. 25, 2002), which is incorporated herein by reference.

FIELD OF INVENTION

This invention relates generally to an incentive system, and more particularly, to an incentive system which allows consumers to convert loyalty points to merchant-specific dollars and utilize the various merchant dollars using a single code key.

BACKGROUND OF THE INVENTION

Loyalty systems (also known as promotion or incentive systems) were developed, in part, to not only motivate the consumer to purchase a particular item, but also to promote consumer loyalty to a merchant, transaction card or service provider.

Generally, such programs reward consumers for buying a particular product or conducting repeat business with the same merchant by issuing a coupon, distributing a loyalty card or issuing loyalty points. Whether the coupon or card is issued directly or in exchange for loyalty points, consumers typically accumulate various coupons, loyalty cards and certificates from different merchants wherein the coupons often include, for example, purchase requirements or date restrictions. As such, consumers typically must wait to receive the certificate or card in the mail, spend time organizing the various coupons from different merchants and determining which product to purchase in order to obtain the benefit of a particular coupon. Moreover, consumers typically retain the coupons along with their other forms of payment in order to remind them to use the coupons when they are shopping at a particular merchant. Furthermore, the expiration dates must be monitored in order to avoid losing the ability to utilize the coupon and the coupons often can only be redeemed during one purchase transaction, so the full amount of the coupon must be used at once or the remaining value is usually lost.

In addition to coupons or certificates, merchants may issue loyalty points to a consumer account associated with a merchant specific loyalty card. However, because numerous merchants participate in loyalty programs, consumers often retain many loyalty cards, each having a different loyalty account number along with different rules and requirements. Moreover, after accumulating loyalty points, the consumer then redeems the loyalty points in various ways, including exchanging the loyalty points for additional goods and services. For example, the rewards may be selected from a merchant approved list or a merchant redemption catalog. The loyalty points are usually calculated using a predetermined formula or ratio that relates a consumer's purchase volume (i.e., in terms of money value or some other volume parameter) to a certain number of loyalty points. For example, loyalty points may be issued on a one-for-one basis with each dollar that a consumer spends on particular goods and services. Loyalty points may also be issued based upon a consumer meeting a pre-defined rule such as, frequency of purchases at a merchant or frequency of purchasing a particular product. However, the consumer needs to remember or keep track of loyalty point balances and reward options from various merchants.

One well-known example of a consumer incentive program is a "frequent flyer" program which usually issues an airline specific frequent flyer card, then rewards airline passengers with "mileage points" based upon the distances that the passengers fly with a particular airline. The mileage points may then be redeemed for free airfare or free car rentals. Other incentive award programs are designed to induce usage of particular financial instruments, such as credit cards or debit cards, by accumulating loyalty points or dollar value points based upon the volume of purchases made using the particular financial instrument. These types of programs may be designed such that clients of the financial institution accumulate loyalty points which can be redeemed for selected goods or services or, alternatively, consumers accumulate points which have a dollar value which can be applied toward a credit or debit balance, depending on whether the instrument is a credit or debit instrument, for example.

Because of the numerous coupons, certificates, and loyalty cards that are typically retained by consumers, a need exists to consolidate the loyalty programs from various merchants into a centralized database wherein, for each consumer, the database can monitor loyalty point balances for various merchants. Moreover, a need exists for the consumer to access the database using one code or loyalty account number.

SUMMARY OF THE INVENTION

In an exemplary embodiment, the invention includes a loyalty system which allows a consumer to accumulate general loyalty points from one or more merchants, then convert any desired subset of general loyalty points to loyalty dollars (or monetary equivalent) associated with a specific merchant. The system stores, for each consumer, the loyalty dollars by merchant within a remotely-accessible host database, within the magnetic stripe or within a smart card database. Upon conducting a purchase at a particular merchant, the consumer may utilize a consumer ID (code key) to facilitate access to the consumer's own loyalty dollars for the particular merchant. The loyalty dollars are then applied to the purchase transaction as a discount or rebate. The consumer may also re-load the loyalty dollars.

The system and method facilitates the redemption of loyalty points by obtaining a loyalty card having a unique identifier and loyalty points associated therewith; accessing a loyalty database utilizing the unique identifier; converting at least a portion of the loyalty points to a first value associated with a first merchant; saving the first value in a first database associated with said loyalty card; converting at least a portion of the loyalty points to a second value associated with a second merchant; saving the second value in a second database associated with the loyalty card account; redeeming the first value at the first merchant; and, redeeming the second value at the second merchant. The loyalty point account may also be re-loaded by converting at least a portion of the loyalty points to a third value associated with a first merchant; and saving the third value in a first database associated with the loyalty card account.

BRIEF DESCRIPTION OF THE DRAWINGS

The accompanying drawings, wherein like numerals depict like elements, illustrate exemplary embodiments of the present invention, and together with the description, serve to explain the principles of the invention. In the drawings.

DETAILED DESCRIPTION

Figure 1:
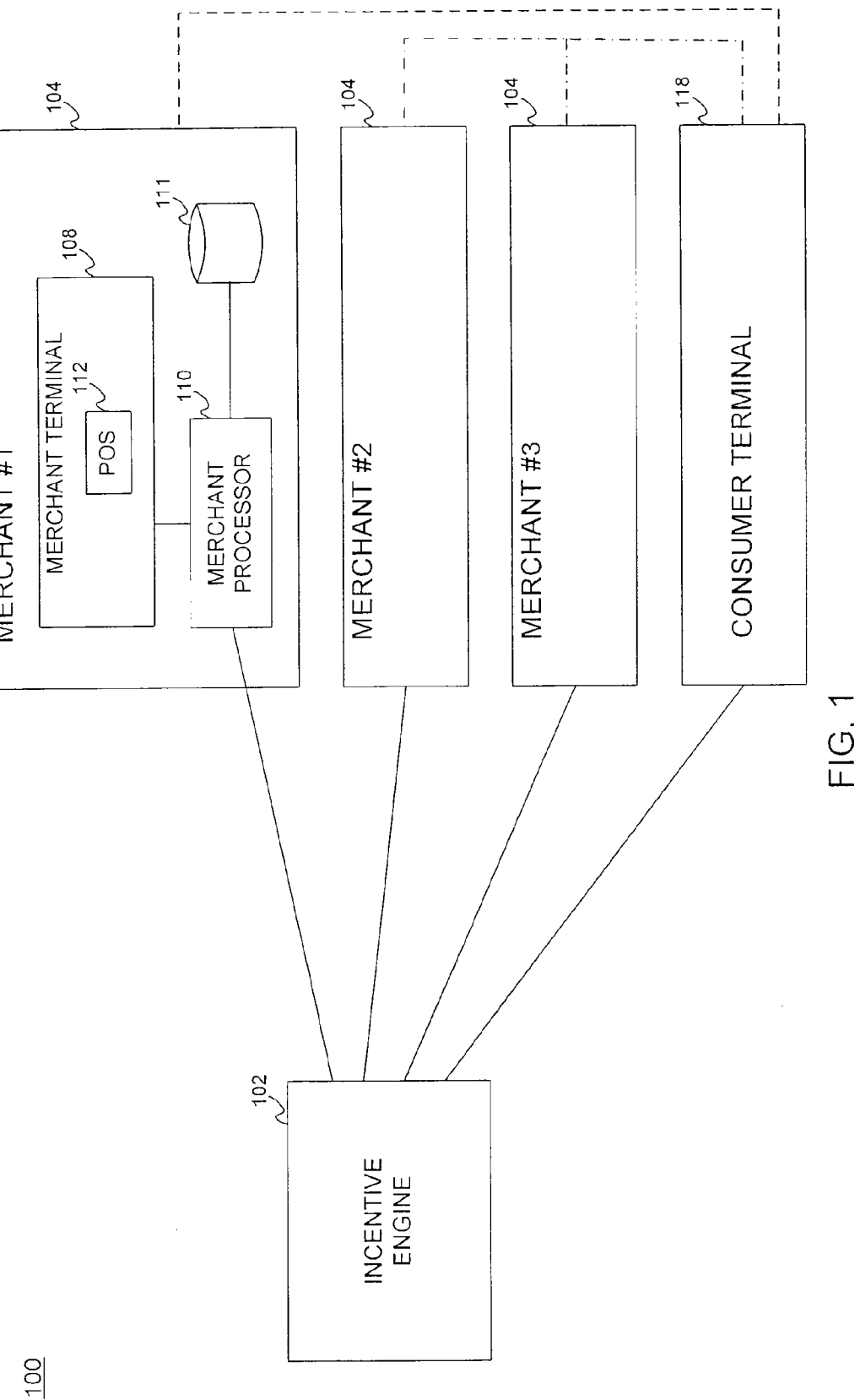
FIG. 1 is a schematic block diagram illustrating an exemplary incentive system in accordance with various aspects of the present invention.

In general, the loyalty system of the present invention facilitates the conversion of a subset of general loyalty points to merchant-specific loyalty dollars, stores for each consumer the loyalty dollars by merchant within a database and allows the consumer to utilize the various merchant loyalty dollars using a single code key or consumer ID. The loyalty dollars may then be applied to the purchase transaction as a monetary equivalent, discount or rebate. When desired, the consumer may also re-load the loyalty card account by converting additional loyalty points to merchant dollars.

The present system and method provides a simpler and efficient consumer experience because the consumers will not need to carry multiple coupons, gift certificates or stored value cards in order to obtain rewards at multiple merchants. Moreover, the system does not need to issue multiple stored value cards or certificates upon each consumer request to redeem points for a gift card or certificate. With the reduced amount of cards to create and distribute, along with reduced servicing costs associated with servicing lost or stolen certificates and/or stored value cards, the present loyalty system is less expensive to implement (e.g., reduced overhead, inventory and operating costs). Moreover, because the loyalty system is more convenient, consumer engagement is increased (e.g., more points earned) and the system may accelerate point redemption which may allow the loyalty system and merchants to recognize increased revenue and utilization of promotions on an accelerated schedule.

The detailed description herein of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. Thus, the following detailed description is presented for purposes of illustration only and not of limitation, and the scope of the invention is defined solely by the appended claims when properly read in light of the following description.

Moreover, it should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present invention is described herein with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The incentive engine 102 may be a stand-alone system or incorporated into any pre-existing transaction system or loyalty system via any software and/or hardware customization or upgrades. For example, the loyalty system 100 may provide a turn-key loyalty solution for participating merchants such that consumers may earn points by presenting a pre-established consumer ID or code key at the point of sale 112. Incentive engine 102 and/or related databases may be stored in a remote system and accessed via any communication network discussed herein. In another embodiment, incentive engine 102 may exist within a portable device having a processor, such as a smart card, personal digital assistant, laptop or other portable processor of information. In the these embodiments, any one or more of processing functions, memory and/or databases may be stored locally on the smart card or other device. In another embodiment, the merchant dollars and other data may be encoded into the card, such as, for example, into a magnetic stripe, bar code, optical device and/or the like. In this manner, remote access is not necessary and when the value on the card is extinguished, the user may simply dispose of the card, obtain a new card or re-load the card with additional value. Alternatively, any combination of remote accessibility or local access is contemplated.

Consumers may participate in the system when shopping at a "brick and mortar" store or on the internet, for example, at a particular merchant, at a chain of merchants, at a coalition of merchants or within a group of merchants located within a shopping mall. The loyalty system may provide the platform for recording where consumers shop, earning points by consumers and for billing merchants for points accordingly. In addition to earning base points, consumers may also be able to earn bonus points through bonus point promotions. In this regard, merchants may offer bonus points to incent consumers to trial a new product or to increase the frequency of high margin purchases.

In other embodiments of loyalty system 100, the reward may also be earned from buying specific products based upon the association of UPC data and merchant SKU data. Rather than simply capturing transactions at a Record of Charge (ROC) level, that is, recording consumer purchases in a general fashion by designating purchase categories (such as "clothing", "electronics", or "hardware" for example), the system identifies the particular item purchased (such as "jeans", "stereo", or "hammer" for example) as well as its corresponding manufacturer. By matching or associating the merchant SKU and the manufacturer's UPC, the system facilitates the standardization of goods and/or services codes at the network level. This standardization not only permits a record of both the specific item purchased and its manufacturer, regardless of the particular merchant involved in the transaction, but it permits the mapping of multiple consumers, multiple goods and/or services, multiple merchants, and/or multiple manufacturers to advantageously cross-market goods and services to consumers and allow the issuance of loyalty points based on the UPC and/or SKU data. For more information related to the association of UPC data and merchant SKU data, see for example, U.S. patent application Ser. No. 09/836,213, filed on Apr. 17, 2001 by inventors Voltmer, et al. and entitled System And Method For Networked Loyalty Program, which is hereby incorporated by reference. After earning the loyalty points, consumers may be allowed to redeem the loyalty points for cash off new purchases at participating merchants along with other redemption options such as, for example, merchandise, travel packages and/or the like.

In general, in loyalty system 100, the incentive engine 102 maintains an account for each participating consumer along with general loyalty points and merchant-specific loyalty dollar. The system may also apprise the consumer of the loyalty point totals and account activity, for example, in one embodiment, the consumer can view the balance of loyalty points and/or newly issued loyalty points via the POS terminal 112 during a purchase transaction, as more fully described below. Additionally, the consumer may review the total number of points in the account either online or off-line, such as through a periodic statement sent by the loyalty system 100 or through the use of a communications network, such as the Internet, for example. Points in the consumer's account may be accumulated across multiple merchants and/or manufacturers participating in the system. Thus, points earned by a consumer based upon transactions with different merchants and/or manufacturers may be combined, resulting in a rapid accrual of points. The loyalty system 100 may offer a pre-established reward or a catalog of products and services, which may be either online or off-line, from which consumers may select rewards in exchange for accrued points. In this manner, consumers advantageously earn points based upon their everyday purchases of products and services, these points are accrued across merchants and/or manufacturers, and points redemption may take place through a single, universal catalog of rewards. The points may be redeemed for cash, products, services or categories of the same. For example, a consumer may redeem points for a pair of Gap jeans (SKU 1234) and an 8 ounce container of Hagen Daas ice creme anywhere within the coalition of merchants, a subset of merchants or from other merchants (off-line or on-line).

For more information on loyalty systems and transaction systems, see for example, U.S. Continuation-In-Part patent application Ser. No. 10/027,984 filed on Dec. 20, 2001 by inventors Ariff, et al. and is entitled System And Method For Networked Loyalty Program; U.S. Continuation-In-Part patent application Ser. No. 10/010,947 filed on Nov. 6, 2001 by inventors Haines, et al. and is entitled System And Method For Networked Loyalty Program; U.S. Continuation-In-Part patent application Ser. No. 10/084,744 filed on Feb. 26, 2002 by inventors Bishop, et al. and is entitled System And Method For Securing Data Through A PDA Portal; the Shop AMEX™ system as disclosed in Ser. No. 60/230,190 filed Sep. 5, 2000; the MR as Currency™ and Loyalty Rewards Systems disclosed in Ser. No. 60/197,296 filed on Apr. 14, 2000, Ser. No. 60/200,492 filed Apr. 28, 2000, Ser. No. 60/201,114 filed May 2, 2000; a stored value card as disclosed in Ser. No. 09/241,188 filed on Feb. 1, 1999; all of which are herein incorporated by reference. Moreover, other examples of an online membership reward systems are disclosed in Netcentives' U.S. Pat. No. 5,774,870, issued on Jun. 30, 1998, and U.S. Pat. No. 6,009,412, issued on Dec. 29, 1999, both of which are hereby incorporated by reference.

As used herein, points or merchant dollars may include any incentive, loyalty, award, reward, motivation, performance, purchased, exchanged, earned or any other points which may be acquired by or for a consumer. The points may or may not have monetary equivalents. The value of any monetary equivalents may vary or change based on a time period, promotion period, pre-established period, merchant directed criteria and/or the like. Points, as discussed herein, may also include cash, products and/or product categories. For example, a consumer may be awarded a free or reduced price product, the ability to obtain a product upon meeting certain conditions and/or the like.

General loyalty points may include any points that are acquired or earned by a consumer from any source. Merchant-specific loyalty points (loyalty dollars, merchant dollars or the like) may include any points which are earned or acquired directly from a merchant or group of merchants and/or are converted from general loyalty points. Moreover, the merchant dollars may have monetary equivalents may vary or change based on a time period, promotion period, pre-established period, merchant directed criteria and/or the like and which may be used as a discount or rebate.

A consumer may include any person, entity, charitable organization, merchant, business, hardware and/or software which participates in the present system and may utilize a code key. A code key includes any consumer ID, device, code, code key or other identifier suitably configured to allow the consumer to interact or communicate with the system, such as, for example, a rewards card, charge card, credit card, debit card, prepaid card, telephone card, smart card, magnetic stripe card, bar code card, transponder, authorization/access code, personal identification number (PIN), Internet code, other identification code, and/or the like. Additionally, a consumer ID may include any form of electronic, magnetic, wireless and/or optical device capable of transmitting or downloading data from itself to a second device which is capable of interacting and communicating with such forms of consumer ID. A consumer profile may include any data used to characterize a consumer and/or the behavior of a consumer. In the context of a commercial transaction, a consumer profile may include, for example, the time and date of a particular purchase, the frequency of purchases, the volume/quantity of purchases, the transaction size (price), and/or the like. Any aspects of the consumer profile may be used in the context of data analysis.

Merchant may include any person, website, retailer, manufacturer, distributor, financial institution, issuer, acquirer, consumer, hardware, software or any other entity that desires to participate in the loyalty system 100. Merchant ID includes any symbol, indicia, code, number, or other identifier that may be associated with a merchant of any type of goods and/or services offered to a consumer or other end-user. A merchant ID may also include or be associated with a store ID, which designates the location of a particular store. A third-party provider may include any additional provider of goods and/or services to a consumer. Specifically, a third-party provider includes any party other than the particular manufacturer and merchant who is involved in a transaction with a consumer. A third-party provider may include, for example, a financial institution, such as a bank or an issuer of a financial instrument (such as a credit card or a debit card). A third-party provider may also include a provider of goods and services which are offered as awards to consumers in exchange for a requisite number of loyalty points.

Purchase data may include data relating to the offer of any item to a consumer or other end-user. Purchase data may include any of the following: an item purchased, an item price, a number of items purchased, a total transaction price, a payment vehicle, a date, a store identifier, an employee identifier, a merchant item identifier, a loyalty identifier, and/or the like. An award or reward may include any quantity of products, services, coupons, gift certificates, rebates, loyalty points, bonus points, credits or debits to a financial instrument, and/or the like.

Though the invention may generically be described with reference to a series of transactions which transfer a good or service from an originating party to an intermediary party and a subsequent transaction which transfers the good or service from the intermediary party to an end-user of that good or service, for convenience and purposes of brevity and consistency, the present disclosure generally refers to the originating party as a manufacturer, the intermediary party as a merchant, the end-user as a consumer, and a good or service as a product or item. However, it will be recognized by those of ordinary skill in the art that the merchant need not provide a product or item to a consumer in exchange for monetary currency. While this often may be the case, the present disclosure is not so limited and includes transactions which may be gratuitous in nature, whereby the merchant transfers a product or item to a consumer without the consumer providing any currency or other value in exchange. It is further noted that additional participants, referred to as third-party providers, may be involved in some phases of the transaction, though these participants are not shown. Exemplary third-party providers may include financial institutions, such as banks, credit card companies, card sponsoring companies, or issuers of credit who may be under contract with financial institutions. It will be appreciated that any number of consumers, merchants, manufacturers, third-party providers, and the like may participate in the system of the present invention.

The system may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system (e.g., Windows NT, 95/98/2000, Linux, Solaris, etc.) as well as various conventional support software and drivers typically associated with computers. User computer can be in a home or business environment with access to a network. In an exemplary embodiment, access is through the Internet through a commercially-available web-browser software package.

Communication between the parties to the transaction and the system of the present invention is accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The computers utilized in the present invention may provide a suitable website or other Internet-based graphical user interface which is accessible by users. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "webpage" as it is used herein is not meant to limit the type of documents and applications that might be used to interact with the user.

For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

In an exemplary embodiment, and with reference to FIG. 1, merchant system 104 includes a merchant terminal 108 and a merchant processor 110 in communication with merchant database 111. Merchant terminal 108 includes any software, hardware and/or device capable of facilitating receipt, identification and/or transmission of a consumer ID. Exemplary devices for identifying a consumer ID may include a keypad, a conventional card reader which recognizes a magnetic stripe or bar code associated with a consumer ID, a biometric device, a smart card reader which recognizes information stored on a microchip integrated with a consumer ID, and/or any device capable of receiving or uploading consumer ID data transmitted electronically, magnetically, optically, and/or the like. In one embodiment, merchant terminal 108 and merchant processor 110 are co-located at a retail store. In another embodiment, retail terminal 108 and merchant processor 110 are remote from each other.

In an exemplary embodiment, as again illustrated in FIG. 1, merchant terminal 108 includes a merchant POS terminal 112, such as a cash register, a magnetic stripe card reader, a smart card reader, a bar code scanner and/or the like. POS terminal 112 includes a suitable display or printing device configured to display and/or print loyalty point information in accordance with the present invention. When a consumer ID is used at the time an item is purchased, purchase data, which may include a SKU number, price, etc, is input, sensed, or otherwise recognized by terminal 108, and then the purchase data is processed and stored by merchant processor 110. Merchant processor 110 includes or is in communication with a suitable database 111 or other storage device for maintaining and storing purchase data and any other suitable merchant information. Database 111 may be any type of database, such as any of the database products and functions described herein for example. Database 111 may be organized in any suitable manner, including data tables or lookup tables. Purchase data that is stored in database 111 is available to the merchant's local back office system (not shown) for inventory, accounting, tax, data analysis, and/or other purposes. The captured purchase data may include the item purchased, the item's unit price, the number of items purchased, the date, the store location, an employee ID, and any other information related to the purchase. In an exemplary embodiment, merchant processor 110 may also receive, process, and store manufacturer data, such as information regarding products and/or services and UPC data. The manufacturer data may be stored in any suitable form, including data tables or lookup tables.

In alternative exemplary embodiments (not shown), purchase data may also be transmitted to and stored and processed by a merchant regional processor (or, alternatively, a merchant national database (not shown)) in communication with another database for the purpose of further back office and cumulative data analysis. In an exemplary embodiment, merchant processor 110 optionally may be integrated with a merchant regional processor, thereby forming a single device. In another embodiment, merchant processor 110 and merchant regional processor are separate devices which may be either co-located with each other or remotely located from one another. For example, in one embodiment, merchant processor 110 and regional processor are co-located at a particular retail store. In another embodiment, merchant processor 110 is located at a particular retail store and merchant regional processor is remotely located at a regional office.

Regardless of the location of merchant regional processor, merchant regional processor receives and processes similar information from each of the merchant processors 110 associated with each of the retail stores owned by the same merchant. Whether the system 100 includes a merchant regional processor or a merchant national processor may be a function of the number of stores maintained by a particular merchant. That is, a larger merchant who has numerous stores throughout a country or region, for example, may choose to have a plurality of regional processors, while a smaller merchant with a few stores scattered across a country may be better served by a single, national processor. In exemplary embodiments, the merchant regional processors and/or national processors communicate with a suitable database or other storage device which is configured to store and maintain purchase data and any other suitable merchant information. In another exemplary embodiment, the merchant regional processor may receive, process, and store manufacturer data, such as information regarding products and/or services and UPC data. The manufacturer data may be stored in any suitable form, including data tables or lookup tables.

In another exemplary embodiment, loyalty system 100 further includes a consumer terminal 118. Consumer terminal 118 includes any remote terminal through which a consumer may access other aspects of the system 100. Consumer terminal 118 may include any of the input devices, computing units, or computing systems described herein, such as, for example, kiosk, personal digital assistant, handheld computer (e.g., Palm Pilot®, Blackberry®), cellular phone and/or the like. Further, consumer terminal 118 communicates with the system 100 through any of the communications networks described herein. In one embodiment, consumer terminal 118 permits a consumer to engage multiple facets of the system 100 in an interactive online communications environment. The interactive online environment made available through consumer terminal 118 is an extension of the network-level incentive award program and is implemented in conjunction with other aspects of the system 100. In this context, a consumer may use consumer terminal 118 for a variety of purposes. In one embodiment, consumer terminal 118 may be used to communicate with and receive information from incentive engine 102. Incentive engine 102 may also send or push any of the information discussed herein to consumer terminal 118. For example, a consumer may use consumer terminal 118 to do any of the following: enroll in the system; receive statements or reports regarding accumulated general loyalty points totals or merchant-specific loyalty point totals; receive bonus details; view potential awards which the consumer may obtain in exchange for various numbers of points; select an award; receive redemption information; view points adjustments; redeem loyalty points for a selected award; request and/or receive a loyalty points advisory statement; receive information regarding where and how points were earned and/or how points were redeemed; receive information regarding expiration dates for points earned; receive information relating to any applicable fees; receive information regarding marketing promotions; and/or view a directory of participating merchants, manufacturers, and/or third-party providers.

In another embodiment, consumer terminal 118 may be used to interact with and/or make purchases and generate loyalty points from participating online merchants, as illustrated by the various phantom lines in FIG. 1. The online merchant may then communicate with the incentive engine 102 to transmit and process a consumer ID, purchase data, etc., as described above with reference to merchant 104 of FIG. 1. Information communicated between the online consumer, the online merchant, and the online incentive engine may include, for example, product or service information, prices, availability of the product or service, shipping information, loyalty points information, available awards, information regarding points ratios and points redemption, and/or the like. In one embodiment, consumer terminal 118 operates in real-time, as described above with respect to incentive engine 102. In another embodiment, the consumer terminal 118 may operate in batch mode, as described above. In still a further embodiment, consumer terminal 118 operates in a manner which includes aspects of both real-time functionality and batch mode functionality.

With reference again to FIG. 1, a consumer may be updated with regard to various aspects of the system via incentive engine 102. For example, incentive engine 102 may inform consumers of the number of loyalty points that they have accumulated from all system merchants generally or the merchant-specific points from a particular merchant and the types of awards that may be obtained using those loyalty points. Moreover, incentive engine 102 may suggest to the consumer various awards for which the consumer is eligible based upon the loyalty points generated by the consumer's network-wide purchases. In this context, network-wide purchases include any purchases of items corresponding to merchants participating in the loyalty system 100. A consumer may use incentive engine 102 to facilitate, for example, any of the following: view accumulated general loyalty points totals or merchant-specific loyalty dollars; view potential awards which the consumer may obtain in exchange for various numbers of points; select an award; redeem loyalty points for a selected award; request and/or receive a loyalty points advisory statement; and/or view a directory of participating merchants, manufacturers, and third-party providers.

In an exemplary embodiment, incentive engine 102 operates in real-time. In this context, "real-time" means that loyalty points are immediately, or nearly immediately, updated at the time purchases are made and are therefore immediately redeemable by the consumer at the point of sale. Moreover, the consumer may convert general loyalty points to merchant-specific loyalty dollars or re-load any merchant loyalty dollar database immediately, or nearly immediately. Thus, for example, a consumer may be informed by incentive engine 102 at the point of sale that the item being purchased by the consumer may be purchased using the consumer's accumulated loyalty points, including points accumulated on a network level. Points accumulated on a network level enable consumers to accumulate points more rapidly than would be possible if only a single merchant or group of merchants were issuing the points. In one embodiment, incentive engine 102 may update a consumer's loyalty points in real-time and, in response to the consumer's particular points total, issue a free product, a coupon, a gift certificate, and/or additional bonus points to the consumer.

In another exemplary embodiment, the system may operate partially in real-time and partially in batch mode, wherein during batch mode, points totals are calculated, stored, and periodically updated for access by the merchant terminal 108, including POS terminal 112 and/or incentive engine 102. Thus, in this embodiment, the consumer may be notified of certain available points sometime after a purchase, or a suggestive sale may take place after a purchase. The total point count or suggestive sale may take into account points generated and accumulated as the result of network-wide purchases.

Figure 2:
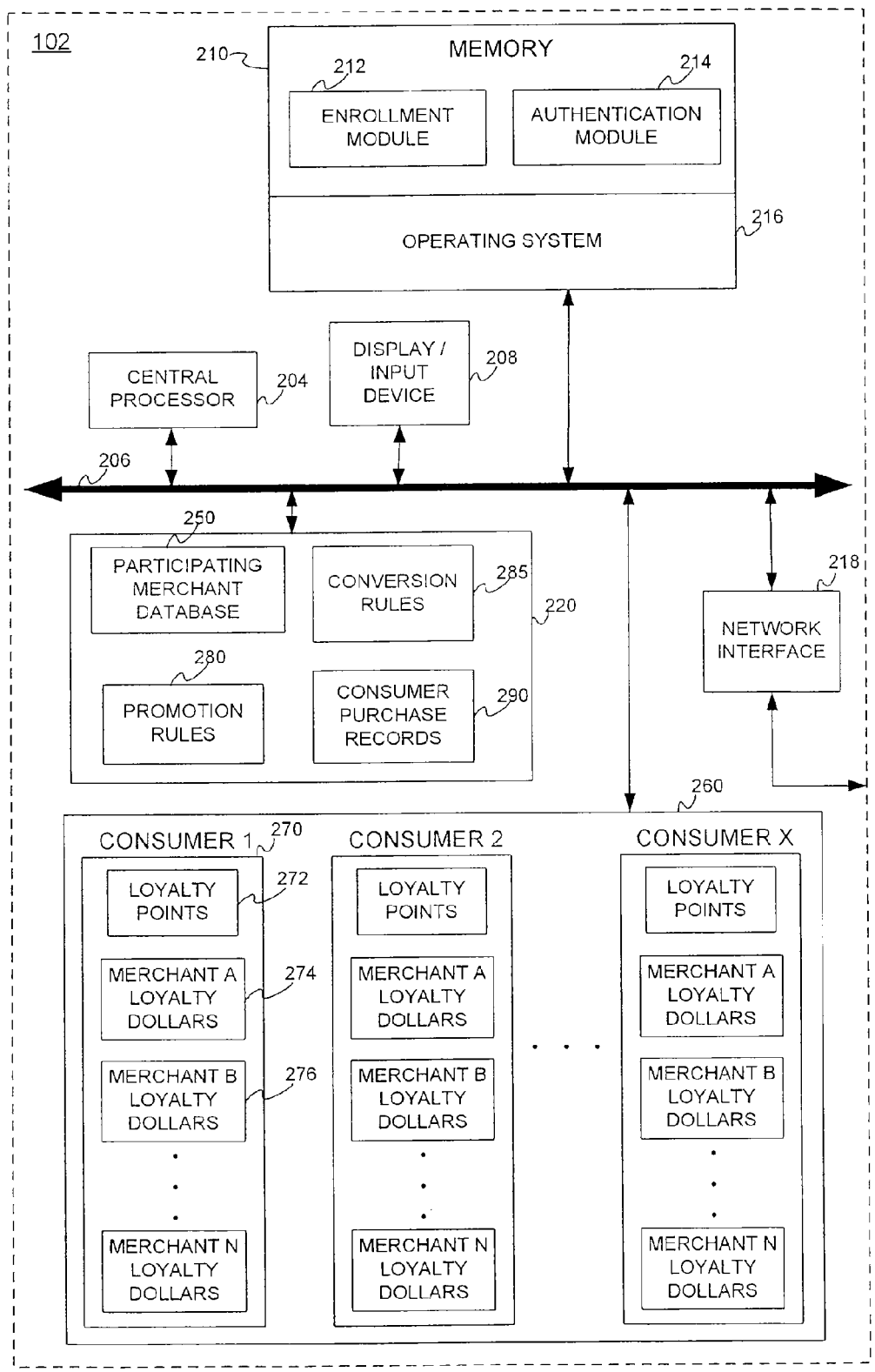
FIG. 2 is a schematic block diagram illustrating details of an exemplary incentive engine and database in accordance with various aspects of the present invention; and, FIG. 3 is a flowchart illustrating an exemplary process for the operation of the multiple merchant stored value system in accordance with various aspects of the present invention.

More particularly, with reference to FIG. 2, the incentive engine 102 manages the incentive portion of system 100. In an exemplary embodiment, incentive engine 102 receives, processes, and/or stores data in the applicable databases 220 including, for example, participating merchant database 250, consumer accounts database 260, promotion rules database 280 and consumer purchase records 290. The incentive engine 102 may receive and process consumer ID information and/or purchase data from any of the merchant systems 104 and/or consumer terminal 118. The incentive engine 102 may also associate a particular consumer ID with the purchase data and a corresponding manufacturer item identifier. In one embodiment, the incentive engine 102 performs an analysis involving any of the following: a consumer ID, purchase data, a points ratio, a consumer profile, a merchant ID, and a manufacturer ID. The analysis may be dependent upon an the association of the consumer IDs, the purchase data, and the manufacturer item identifier. The analysis may further include, for example, a calculation of loyalty points and/or other analyses for purposes of market segmentation, determining consumer spending behavior, correlating spending behavior and consumer demographics, and/or the like.

The databases discussed herein (e.g., 250, 260, 270, 280, 290 and 111) may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and merchant data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

With continued reference to FIG. 2, an exemplary incentive engine 102 includes a central processor 204 in communication with other elements of the incentive engine 102 through a system interface or bus 206. A suitable display device/input device 208, such as a keyboard or pointing device in combination with a monitor, may be provided for receiving data from and outputting data to a user of loyalty system 100. A memory 210 associated with the incentive engine 102 includes various software modules; such as, for example, an enrollment module 212 and an authentication module 214 for example. The memory 210 preferably further includes an operating system 216 which enables execution by processor 204 of the various software applications residing at enrollment module 212 and authentication module 214. Operating system 216 may be any suitable operating system, as described herein. Preferably, a network interface 218 is provided for suitably interfacing with other elements of the loyalty system 100, such as the elements described herein with reference to FIGS. 1-2.

It will be appreciated, that many applications of the present invention could be formulated. One skilled in the art will appreciate that the network interface 218 may interface with any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

The computing units may be connected using network interface 218 with each other via a data communication network. The network may be a public network and assumed to be insecure and open to eavesdroppers. In the illustrated implementation, the network may be embodied as the internet. In this context, the computers may or may not be connected to the internet at all times. For instance, the consumer computer may employ a modem to occasionally connect to the internet, whereas the merchant computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The systems may be suitably coupled to network via data links, such as network interface 218. A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. Merchant system might also reside within a local area network (LAN) which interfaces to network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

Each participant may be equipped with a computing system to facilitate online commerce transactions. The consumer has a computing unit in the form of a personal computer, although other types of computing units may be used including laptops, notebooks, hand held computers, set-top boxes, and the like. The merchant has a computing unit implemented in the form of a computer-server, although other implementations are possible.

With continued reference to FIG. 2, enrollment module 212 of incentive engine 102 receives information from consumers or merchants who wish to participate in the system. Enrollment module 212 accesses and stores information in storage device 220. Authentication and/or validation of the identity and status of participants, including any of the other system components, may be performed by the authentication module 214, which preferably has access to the records residing in storage device 220.

Storage device 220, such as a hard disk drive for example, includes files or records which are accessed by the various software modules, such as enrollment module 212 and authentication module 214. One skilled in the art will appreciate that the storage device 220, and therefore the various databases associated therewith, may be co-located with the incentive engine 102 or may be remotely located with respect to the incentive engine 102. If the storage device 220 is remotely located with respect to the incentive engine 102, communication between storage device 220 and incentive engine 102 may be accomplished by any suitable communication link but is preferably accomplished through a private intranet or extranet. Moreover, the data discussed herein may be temporarily or permanently located in one database, located in multiple databases or shared among databases in order to facilitate the functions described herein.

In particular, consumer accounts database 260 may include consumer ID information, information received from a consumer upon registration with the incentive engine 102 and general loyalty point or merchant-specific loyalty dollar information. For each consumer or group of consumers, consumer accounts database 260 may include a consumer account balance database 270, wherein X is the total number of participating consumers (database 260 may include extra databases 270 for potential future participating consumers). Each consumer account balance database 270 may itself include data corresponding to each consumer's loyalty account. In particular, each consumer account balance database 270 may include cumulative general loyalty points totals in loyalty points database 272 as well as converted or acquired merchant loyalty dollars for each participating merchant in merchant loyalty databases (274, 275 . . . N), wherein N is the total number of merchant loyalty databases in which a consumer has earned and/or converted (or may earn or convert) loyalty points into merchant-specific loyalty dollars. For example, incentive engine 102 may include 1,500 general loyalty points for consumer1 in database 272. If the consumer desires to apply some of the points to merchant dollars to be used at The Gap, consumer1 may convert 500 of the loyalty points via conversion module 215 into Gap loyalty dollars. Upon conversion, consumer1 loyalty point database 272 will be reduced to 1000 points, while merchantA loyalty dollar database 274 will be increased to 500 Gap dollars.

Promotion rules database 280 includes information received from the various participating merchants related to the requirements or levels to be reached by consumers in order for the consumer to earn a particular reward or loyalty points/dollars. Conversion rules 285 is any software and/or hardware for suitably converting general loyalty points into merchant-specific loyalty dollars. Conversion rules 285 may include a points ratio rule, time limit rule, maximum point conversion rule, restrictions on conversion of general loyalty points into certain merchant dollars and/or any other restriction or rule which is followed in the conversion process. Conversion rules 285 may also interact with promotion rules database 280 in order to verify or follow other rules. Consumer purchase records database 290 includes information received from the various participating merchants regarding purchases by the particular consumer.

Participating merchant database 250 includes any information related to merchants that may be utilized by the loyalty system 100. Merchants 104 may transmit data to incentive engine 102 in any form and by any means known in the art, including any of the communications means described herein. Merchant database 250 may include, for example, information regarding products and/or services, UPC data, qualifications for obtaining loyalty points, etc. transmitted by merchants 104 who have enrolled in loyalty system 100.

Figure 3:
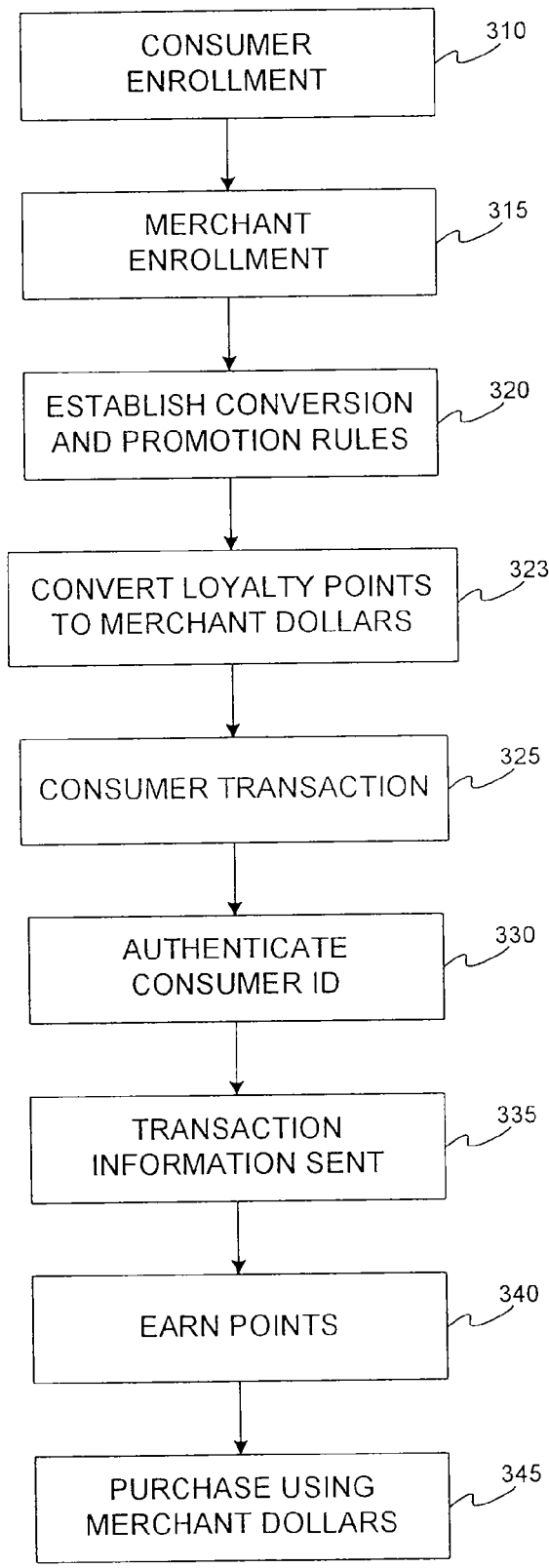

Referring next to FIG. 3, the process flow depicted is merely an exemplary embodiment of the invention and is not intended to limit the scope of the invention as described above. It will be appreciated that the following description makes appropriate reference not only to the steps depicted in FIG. 3, but also to the various system components as described above with reference to FIGS. 1-2.

A consumer may register or enroll to participate in loyalty system 100 by any methods known and practiced in the art (step 310). In one embodiment, a consumer registers by interfacing with enrollment module 212 to establish a consumer account in consumer account database 260 (as shown in FIG. 2). For example, a consumer may be enrolled automatically (e.g. if the consumer holds an existing account with the loyalty system operator), over the phone, at the point of sale, through a paper application, through verbal interview, through the mail, through a merchant, or through instant enrollment online via network interface 218. Consumer enrollment data may include any of the following: name; address; date of birth; social security number; email address; gender; the names of any household members; a credit card number for charging any fees that may be associated with participation in the system; survey data; interests; educational level; products of interest; previously purchased or used goods or services and/or any preferred brand names.

Upon enrollment, the consumer may receive a consumer ID (e.g., key code). The consumer ID may be associated with a household account which specifies the consumer as a primary member and permits the identification of supplementary members associated with the consumer's household who may also earn loyalty points for the consumer. The consumer ID may include any device, code, or other identifier/indicia suitably configured to allow the consumer to interact or communicate with the system, such as, for example, authorization/access code, personal identification number (PIN), Internet code, other identification code, and/or the like which is optionally located on a rewards card, loyalty card, charge card, credit card, debit card, prepaid card, telephone card, smart card, magnetic stripe card, bar code card, radio frequency card and/or the like. The account number may be distributed and stored in any form of plastic, electronic, magnetic, radio frequency, audio and/or optical device capable of transmitting or downloading data from itself to a second device. A consumer ID may be, for example, a sixteen-digit credit card number, although each credit provider has its own numbering system, such as the fifteen-digit numbering system used by American Express Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the consumer.

In accordance with another embodiment of the present invention, system 100 permits an open payment system. Since the invention generally provides that consumer participation in the system may include the use of a consumer ID, a consumer may use any of multiple payment vehicles (such as cash, check, charge card, credit card, debit card, MasterCard®, Visa®, and/or the American Express® Card for example) to make purchases at the various merchants and still participate in the system. Thus, in one embodiment, the consumer ID is independent of any particular payment vehicle, such as a credit card for example. In certain embodiments, the merchant computer and the bank computer are interconnected via a second network, referred to as a payment network. The payment network represents existing proprietary networks that presently accommodate transactions for credit cards, debit cards, and other types of financial/banking cards. The payment network is a closed network that is assumed to be secure from eavesdroppers. Examples of the payment network include the American Express®, VisaNet® and the Veriphone® network.

However, alternate embodiments of the invention may be implemented which associate a consumer ID with a particular payment vehicle, such as a consumer's credit card account, charge card account, debit card account, and/or bank account for example. When a consumer ID is associated with an instrument (e.g., a credit card) from a merchant or third-party provider, the merchant need not provide a rewards terminal or other terminal capable of processing the consumer ID, since the third-party provider may process the consumer ID as part of the payment transaction. Thus, in this embodiment, loyalty points may be earned by the consumer on a network-wide level without the merchant's direct participation in the rewards feature (notwithstanding the merchant's participation in transmitting product data to the system). Moreover, it will be appreciated that a single consumer ID may be associated with multiple third-party payment vehicles, thereby allowing a consumer to generate loyalty points regardless of the particular payment vehicle selected for a particular purchase.

When a merchant or group of merchants desire to offer a promotion in accordance with the present invention, the merchant may register as a participating merchant (step 315) by submitting certain merchant data to the participating merchant database 250, such as, for example, merchant IDs, store IDs, SKUs, UPCs, brands of products and/or the like. Prior to, upon and/or after issuance of the loyalty points to consumers, the merchant may pay the administrator of the loyalty system 100 a certain dollar amount for issuing the loyalty points to consumers. In another embodiment, the incentive engine 102 may charge the merchant upon redemption of the loyalty points by the consumer. Because the loyalty points may be universal and shared among all merchant participants, incentive engine 102 includes various functions to track and monitor loyalty point issuance and/or redemption in order to provide a suitable accounting of the loyalty points to each merchant.

The merchant may then construct and activate the loyalty point or bonus point promotion rules and conversion rules in real-time (step 320) by utilizing the centralized incentive engine 102 and storing the promotion and conversion rules in promotion rules database 280 which allows the appropriate amount of points to be allocated to loyalty point database 272 and allows conversion rules 285 to facilitate performing the appropriate conversion of general loyalty points to merchant-specific loyalty dollars in database 274. In one embodiment, a merchant utilizes any computing device to facilitate access to incentive engine 102 via network interface 218. Alternatively, merchant may access and instruct incentive engine 102 via any other means such as telephone, fax, mail and/or the like to instruct a customer service representative to input the promotion information via display/input device 208. In one embodiment, the merchant may access a form which includes drop-down menus of criteria options and which allows entry of point values associated therewith. The form may include promotion rule options such as, for example, date restrictions for the promotion, maximum number of total points to award, a points ratio related to dollar value purchased, maximum number of total points to award to an individual consumer, and/or the like. The form may also include conversion rule 285 options, such as, for example, points ratio rule, time limit rule, maximum point conversion rule, restrictions on conversion of general loyalty points into certain merchant dollars and/or any other restriction or rule which is followed in the conversion process. Any of the rules may be set as defaults by the loyalty system administrator or changed by the administrator, merchants and/or consumers depending on the level of access that may be configured into the system.

The merchant may offer any type of promotion or conversion rule using any type of criteria. For example, the promotion may allow points to be earned from one merchant, a group of merchants, a group of merchants in a certain region, a group of merchants with similar or complementary products and/or the like. The customers (upon point issuance or during conversion) may be restricted to customers in a certain region, who have previously purchased from a certain merchant(s), purchased a certain product(s), visited a certain merchant(s) a predetermined number of times, purchased or visited within a certain time period, purchased a predetermined minimum dollar amount, purchased a predetermined number of products, purchased a type of product, purchased a brand of product and/or the like. Additionally, in other transactional contexts, the consumer may earn points from other non-purchase behaviors, such as consumer enrollment data, visiting a Web site, referrals of prospective participants in the system, completion of a survey or other information gathering instrument, and/or the like. For instance, a participating consumer may earn loyalty points automatically through a triggering event, such as visiting a Web site, completing an online survey, or clicking on a banner advertisement for example. Offline, a participating consumer may earn loyalty points by purchasing products or services, completing a task or showing their consumer ID to the cashier and triggering the cashier to provide a "behavior" ID which may be input (e.g., by scanning a bar code on a paper survey for example) into the POS terminal. In addition to the base loyalty points, a merchant may offer bonus points (upon point issuance or during conversion) to incent consumers to trial a new product, increase the frequency of high margin purchases and/or the like. Furthermore, incentive engine 102 may allow the loyalty points to be transferred or shared in certain arrangements such as, for example, family points, gifting points to others and/or the like.

In an exemplary embodiment, the invention allows a consumer to accumulate general loyalty points from one or more merchants or transaction card companies. Consumers may earn points by presenting a loyalty identifier at the point of sale (POS) when shopping at a merchant. In one embodiment, the merchant is within a coalition of participating merchants within the loyalty system. The loyalty system may facilitate, for example, the recording of where consumers shop, the earning of loyalty points by consumers and the billing of merchants for points accordingly. In addition to earning base points, consumers may also earn bonus points through bonus point promotions.

After earning loyalty points, consumers may redeem the general loyalty points for discounts off new purchases at participating merchants or convert all or a subset of the loyalty points to merchant specific loyalty dollars (step 323) along with other redemption options, such as, for example, merchandise. The consumer may facilitate interaction with incentive engine 102 via network interface 218 using any communication means disclosed herein, such as, for example, telephone, fax or email a customer service representative which enters and transmits the information to incentive engine 102, and/or utilize Internet, Interactive Voice Response System, consumer terminal 118, POS terminal 112, or any other computing or access device. The consumer may review the total points available, total merchant dollars within each merchant database 274, enrollment status and/or the like. The consumer then transmits the suitable information, such as, for example, desired amount of points for conversion and the particular merchant dollars desired, to incentive engine 102. Incentive engine 102 compares the consumer conversion request to conversion rules 285. If acceptable, the system converts the appropriate amount of loyalty points by deleting the particular amount (or based on a conversion ratio) of loyalty points from loyalty point database 272 and adds a corresponding amount (or based on a conversion ratio) of merchant loyalty dollars (or monetary equivalent) into the appropriate merchant loyalty dollar database (e.g., 274, 276, etc.) as a first value. In another embodiment, the system may store, for each consumer, the merchant-specific loyalty dollars by merchant within a remotely-accessible host database or similarly within a smart card database. As part of a re-load process, the consumer may add more loyalty points and/or convert loyalty points to merchant dollars (e.g., a third value) at any time in a manner similar to the conversion process above.

Upon conducting a purchase at a particular merchant, the consumer may utilize a code key to facilitate access to the consumer's own loyalty dollars for the particular merchant. When a consumer presents a consumer ID to a merchant 104 at the time of purchasing an item from the merchant 104 (step 325), the consumer ID is transmitted to incentive engine 102 because the consumer ID includes, for example, certain digits which cause the POS terminal to suitably access, communicate and transmit information with incentive engine 102. Alternatively, if the consumer ID is associated with a transaction card account, the account number may be transmitted to an acquirer and/or issuer, which in turn, transmits the associated consumer ID to incentive engine 102. After the consumer ID is transmitted to incentive engine 102, it is processed by incentive engine 102.

In one embodiment, authentication module 214 analyzes the submitted consumer ID (step 330) against the pre-established consumer IDs stored in consumer account database 260. In one embodiment, the authentication module 214 may request and/or analyze additional information depending on the configuration of the system as desired by the administrator, consumers and/or merchants. If the submitted consumer ID matches an active, valid consumer ID stored in consumer account database 260, the incentive engine 102 recognizes the consumer ID and identifies the consumer as a participant in the system 100. In an alternative embodiment, if the consumer ID does not match an existing consumer ID, the system may reject the consumer ID, automatically establish a new consumer account database within consumer account database 260 or request more information from the new consumer.

Upon identifying the consumer as a participant in loyalty system 100, the system may instruct merchant terminal 108 via merchant processor 110 to transmit certain purchase data which is captured by merchant POS terminal 112 to loyalty system 100 (step 335). Purchase data may include any of the following: a SKU number; a unit price; a total transaction price; the payment vehicle(s) used; a store ID which identifies the particular store location if a merchant operates more than one store; a department ID, if the store has multiple departments; the date of the transaction; the time of the transaction; the employee ID of the store clerk who facilitates the transaction; a POS terminal ID to identify the particular terminal conducting the transaction; any merchant-specific incentive program ID; and/or the like. The merchant POS terminal 112 may create a transaction file comprising the consumer data (including a consumer ID) and purchase data (including each item purchased), and the transaction file is then stored by the consumer purchase records database 290. In another embodiment, the various transaction files may be consolidated by the merchant processor 110 and then forwarded to the merchant regional processor 114 for further back-office and cumulative data analysis performed by merchant 104 or by loyalty system 100. In an exemplary embodiment, the transaction file is transmitted by either of the merchant processor 110 or the merchant regional processor to incentive engine 102.

After receiving the consumer ID, purchase data and/or any other data from the transaction file, the consumer may earn additional loyalty points or pay for the product or service using merchant dollars. With respect to earning additional loyalty points (step 340), incentive engine 102 compares the data to promotion rules associated with the particular merchant or groups of merchants in promotion rules database 280 and/or to the consumer purchase records in consumer purchase record database 290. If the data does not satisfy the requirements set forth in a promotion rule, incentive engine 102 updates the consumer purchase records database 290 and may transmit a signal to POS terminal 112, wherein the signal may cause a message or graphic to be displayed on a display, illuminate any portion of the POS terminal 112 and/or merchant terminal 108, printed on a receipt, and/or downloaded to a consumer computer, transaction card, personal digital assistant and/or the like. Further information related to illumination of a terminal may be found in U.S. Ser. No. 09/734, 098, filed on Dec. 11, 2000 and entitled Methods And Apparatus For Illuminating A Transaction Card by inventor Alan J. Zausner, which is hereby incorporated by reference. The signal may include, for example, an indication of the status of the consumer account balance from database 270, an indication of points needed to obtain a reward, an indication of the reward that could be obtained, an indication that no reward was allocated during the current purchase and/or the like.

If the data satisfies the requirements set forth in a promotion rule, incentive engine 102 updates the consumer account balance database 270 with the applicable loyalty points. The incentive engine 102 also facilitates transmission of a signal to POS terminal 112, wherein the signal may cause a message or graphic to be displayed on a display, illuminate any portion of the POS terminal 112 and/or merchant terminal 108, printed on a receipt, and/or downloaded to a consumer computer, transaction card, personal digital assistant and/or the like. The signal or message may include, for example, an indication of loyalty points obtained, an indication of the reward that was (or could be) obtained based on the new point balance and/or the like. After the loyalty points are allocated to the consumer, the consumer may redeem the loyalty points for rewards, prizes, travel, discounts, coupons, tickets, and/or the like by calling a customer service representative, faxing a request, using an automated ordering system and/or any other system or method for redeeming loyalty points known in the art. Upon redeeming the reward, the incentive engine 102 may reduce or reset the applicable consumer account balance database 270.

With respect to purchasing a product or service using merchant dollars (step 345), the system facilitates the application of loyalty dollars to the purchase transaction as a discount or rebate. Incentive engine 102 analyzes the merchant ID information to determine the particular merchant loyalty dollar database (274, 276, etc) to review, then determines the total amount of merchant dollars within the particular merchant loyalty dollar database. Based on any existing conversion ratios for the particular merchant or transaction within conversion rules database 285, incentive engine 102 determines if a sufficient amount of merchant loyalty dollars exist for the requested transaction (which may be a subset of the total charge). If a sufficient amount of merchant dollars exists, the system reduces the total charged amount for the transaction by the monetary equivalent of the merchant dollars.

If a sufficient amount of merchant dollars does not exist, the system may inform the consumer by any means disclosed herein. The consumer may convert additional general loyalty points (re-load) to merchant dollars as set forth with respect to step 323 above, the merchant may issue more loyalty points to the consumer as set forth with respect to step 340 above and/or the consumer may transfer merchant dollars from another merchant to the particular merchant dollar database which is being used for the current transaction. In an alternative embodiment, the purchase may be charged to a transaction card, then incentive engine 102 notifies the transaction card system to reverse or deduct the charge based on the monetary equivalent of the merchant dollars. In another alternative embodiment, the purchase may be paid by cash or check, then a credit issued to a transaction card or additional points awarded.

The following provides an example of how the system and method may be implemented. Consumer A converts 5,000 loyalty points to merchant dollars having a monetary equivalent of $50 off his/her purchase at our participating gas station merchant.

The points are deducted from the consumer's general loyalty point account 272 and $50 is credited to the consumer's merchant loyalty dollar account 274 for the gas station merchant (e.g., a first value). When Consumer A conducts a purchase transaction at the gas merchant, he/she swipes or scans a stored value card which transmits the consumer ID (key code) to the loyalty system 100. If the amount of the purchase is $10, the $50 credit in the consumer's gas station merchant loyalty dollar account is reduced by $10. If Consumer A later decides to convert an additional 5,000 loyalty points to an additional merchant dollars having a monetary equivalent of $50 again, the total value accumulated in the consumer's gas station merchant's loyalty dollar account 274 is now $90. If Consumer A now decides to redeem 4,000 loyalty points for merchant dollars having a monetary equivalent of $50 at a grocery store merchant 276, the 4,000 loyalty points are deducted from the consumer's general loyalty account 272 and merchant dollars having a monetary equivalent of $50 is credited to the consumer's grocery merchant loyalty dollar account 276 (e.g., a second value). Consumer A now has two merchant loyalty dollar accounts (274 and 276), namely merchant dollars having a monetary equivalent of $90 to be used at the gas merchant, and merchant dollars having a monetary equivalent of $50 at the grocery merchant. At any time, the consumer may re-load merchant loyalty dollar accounts 274 and/or 276 with additional merchant dollars (e.g., a third value).

The present invention may have been described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "includes", "comprising", or any other variation thereof, are intended to cover a non-exclusive inclusion, such that a process, method, article, or apparatus that includes a list of elements does not include only those elements but may include other elements not expressly listed or inherent to such process, method, article, or apparatus. Further, no element described herein is required for the practice of the invention unless expressly described as "essential" or "critical".

The invention claimed is:

1. An incentive engine configured to facilitate allocation, conversion, and redemption of loyalty points including:
   a processor and a memory;
   an enrollment module configured to enroll at least one of consumers and merchants;
   an authentication module configured to authenticate consumer IDs;
   a participating merchant database in communication with said enrollment module;
   a promotion rules database configured to determine if a reward or general loyalty points are earned based on purchase data;
   a conversion rules database configured to facilitate a conversion request for converting the general loyalty points into a specific first merchant loyalty dollar value or into a specific second merchant loyalty dollar value;
   a transfer module for transferring at least a portion of the second merchant value into the first merchant value for use in a purchase; and
   a consumer accounts database having a general loyalty point database and a plurality of merchant loyalty dollar value databases configured to store the general loyalty points and the specific merchant dollar values.

2. The incentive engine of claim 1, wherein said incentive engine is located within a remotely-accessible host.

3. The incentive engine of claim 1, wherein said incentive engine is located within a smart card.

4. The incentive engine according to claim 1, wherein the conversion rules database is configured to interact with the promotion rules database.

5. The incentive engine of claim 1, wherein said incentive engine is configured to provide a suggestion of various awards to a consumer for which the consumer is eligible based upon the loyalty points generated by the consumer.

6. The incentive engine of claim 1, wherein the incentive engine is configured to operate partially in real-time and partially in batch mode with respect to storing loyalty points and merchant dollars in the consumer accounts database.

7. A method comprising:
   determining, by a computer-based incentive system for converting points, if a reward or general loyalty points are earned based on transaction data;
   facilitating, by the computer-based system, a conversion request for converting the general loyalty points into a first merchant loyalty dollar value or into a second merchant loyalty dollar value;
   transferring, by the computer-based system, at least a portion of the second merchant loyalty dollar value into the first merchant loyalty dollar value for use in a transaction; and
   storing, by the computer-based system and in a consumer accounts database, the general loyalty points and the specific merchant dollar values, wherein the consumer accounts database includes a general loyalty' point database and a plurality of merchant loyalty dollar value databases.

8. An article of manufacture including a non-transitory, tangible computer readable storage medium having instructions stored thereon that, in response to execution by a computer-based incentive system for converting points, cause the computer-based system to be capable of performing operations comprising:
   determining, by the computer-based system, if a reward or general loyalty points are earned based on transaction data;
   facilitating, by the computer-based system, a conversion request for converting the general loyalty points into a first merchant loyalty dollar value or into a second merchant loyalty dollar value;
   transferring, by the computer-based system, at least a portion of the second merchant loyalty dollar value into the first merchant loyalty dollar value for use in a transaction; and
   storing, by the computer-based system and in a consumer accounts database, the general loyalty points and the specific merchant dollar values, wherein the consumer accounts database includes a general loyalty point database and a plurality of merchant loyalty dollar value databases.

* * * * *